(12) United States Patent
Willman

(10) Patent No.: US 7,543,293 B2
(45) Date of Patent: *Jun. 2, 2009

(54) PRIVELEGE LEVEL CHANGING FOR VIRTUAL MEMORY MAPPING

(75) Inventor: Bryan M. Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

This patent is subject to a terminal disclaimer.

(21) Appl. No.: 11/320,499

(22) Filed: Dec. 27, 2005

(65) Prior Publication Data

US 2006/0158690 A1 Jul. 20, 2006

(51) Int. Cl.
| G06F 9/46 | (2006.01) |
| G06F 12/06 | (2006.01) |
| G06F 21/00 | (2006.01) |
| G06F 9/30 | (2006.01) |
| H04L 9/00 | (2006.01) |

(52) U.S. Cl. ............................ 718/100; 711/2; 711/6; 713/166; 712/220

(58) Field of Classification Search ................ 718/100, 718/108; 713/193; 711/2, 6, 154, 163, 202, 711/203, 206, 207, 166; 712/220
See application file for complete search history.

(56) References Cited

U.S. PATENT DOCUMENTS 4,519,032 A * 5/1985 Mendell ..................... 711/173
4,918,653 A * 4/1990 Johri et al. .................... 726/23

(Continued)

FOREIGN PATENT DOCUMENTS

GB 2311152 A * 9/1997

OTHER PUBLICATIONS

Frailey et al. "Software Support for Modern Microprocessor Memory Systems." Midcon Midwest Electron Show Dec. 12-14, 1978, pp. 1-15.

(Continued)

Primary Examiner—Meng-Ai An
Assistant Examiner—Kenneth Tang
(74) Attorney, Agent, or Firm—Workman Nydegger

(57) ABSTRACT

Described is a system and method whereby processes may have multiple memory maps associated therewith to provide curtained memory and overcome other memory-related problems. Multiple maps are used to restrict memory access of existing code such as drivers, without changing that code, and without changing existing microprocessors. A thread of a process is associated with one memory map at a time, which by mapping to different memory locations, provides memory isolation without requiring a process switch. Memory isolation may be combined with controlled, closed memory map switching performed only by trusted code, to ensure that some protected memory is inaccessible to all but the trusted code (curtained memory). For example, the threads of the process may ordinarily run at one privilege level with a restricted map, with map switching is only allowed at a higher privilege level. As the threads run through code, the map may be appropriately changed on entering and leaving the trusted code, thus controlling what memory addresses are accessible based on what code is currently being executed. Map switching among multiple maps eliminates the need to change a process in order to access different memory, thereby allowing expanded memory addressing in a single process and isolating untrusted code run in process from certain memory of that process.

20 Claims, 10 Drawing Sheets

U.S. PATENT DOCUMENTS

| | | | | |
|---|---|---|---|---|
| 5,727,211 | A | 3/1998 | Gulsen | 718/108 |
| 5,729,710 | A | 3/1998 | Magee et al. | 711/203 |
| 6,055,617 | A * | 4/2000 | Kingsbury | 711/203 |
| 6,304,973 | B1 | 10/2001 | Williams | 713/201 |
| 6,393,556 | B1 * | 5/2002 | Arora | 712/229 |
| 7,216,345 | B1 * | 5/2007 | Porter | 718/100 |

OTHER PUBLICATIONS

Blumrich, et al. "Virtual-Memory-Mapped Network Interfaces." Feb. 1995 IEEE Micro, pp. 21-28.

Tanner, Daniel J. "Clearing Up The Confusion: Virtual vs. Mapped Memory." Computer Design, Oct. 1976, pp. 101-105.

Teller, et al. "Locating Multiprocessor TLBs at Memory." Proceedings of 27th Hawaii International Conference of Systems Sciences, Jan. 4-7, 1994, pp. 554-563.

Sznyter, et al. "A New Virtual-Memory Implementation for UNIX." Usenix Association Summer Conference Proceedings, Jun. 9-13, 1986, pp. 81-92.

Baskett, F. "Pascal and Virtual Memory in a Z8000 or MC6800 Based Design Station." Compcon '80 VLSI: New Architectural Horizons, Feb. 25-28, 1980, pp. 25-28.

Hulme, B.B. "Memory Management with the Z80000 Microprocessor." Midcon Conference, Sep. 1-17, 1987, pp. 86-91.

Kaplinsky, Cecil. "Memory Access Paths: Hierarchies and Protection." Wescon Conference 1984, pp. 1-7.

Kotz et al. "The Expected Lifetime of Single-Address-Space: Operating Systems." Sigmetrics 94, pp. 161-170.

Kuei et al. "Efficient Index Generation for Compiling Two-Level Mappings in Data-Parallel Programs." Journal of Parallel and Distributed Computing, vol. 60, No. 2; Feb. 2000, pp. 189-216.

* cited by examiner

PRIVELEGE LEVEL CHANGING FOR VIRTUAL MEMORY MAPPING

The present application claims priority to U.S. Pat. No. 7,073,173, filed Jul. 26, 2001, which claims priority to U.S. Provisional Patent Application Ser. No. 60/251,347, filed Dec. 4, 2000.

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer systems, and more particularly to computer processes and memory.

BACKGROUND OF THE INVENTION

The concept of virtual memory allows a computer system to have more addressable memory (e.g., four gigabytes) than is physically present in the computer system (e.g., 256 megabytes). To this end, each process has a memory map associated with it that maps virtual addresses allocated to that process to actual physical memory addresses. So that the physical memory can be shared without losing its contents, a memory manager trims (pages) the physical memory contents of one process to disk when the physical memory is needed by another process.

A contemporary microprocessor such as of the x86 family of microprocessors has user mode memory and kernel mode memory, and do not allow user mode processes to access kernel mode memory. Because the operating system allocates memory to user mode processes, the operating system works with the CPU to prevent memory conflicts and ensure security by prohibiting each user process from accessing the address space of other user processes. Further, different kinds of access to memory ranges, e.g., read and write access or read-only access, may be granted when memory is allocated to a process.

However, the operating system and other privileged kernel mode programs may access any memory addresses, including the memory of user mode processes. Among other things, this means that kernel mode code such as drivers can easily copy proprietary or confidential data (e.g., copyrighted content such as music or a movie) from any other process. Because contemporary operating systems are based on having freely installable drivers, of which a large existing base is available, it is not considered practical to prevent such access without entirely revising the existing model, such as by verifying the kernel mode components and not allowing other kernel mode components to be added. However, providing a verified operating system that does not allow for the installation of privileged drivers is highly impractical. As a result, a fundamental change to microprocessors that denies unrestricted memory access to all but certain trusted and verified code (e.g., a verified operating system) is considered necessary to provide content security. However, even at significant expense, such a microprocessor will not be available for a number of years.

SUMMARY OF THE INVENTION

Briefly, the present invention provides memory security (sometimes referred to as "curtained memory") and overcomes other memory-related problems by restricting existing code such as drivers, without changing that code and without changing existing microprocessors. This is accomplished by enabling processes to have multiple memory maps, with any given thread (unit of execution) of a process being associated with one of the maps at any given time. This provides memory isolation without requiring a process switch. In addition to providing isolation among the various divisions of code (e.g., procedures or drivers) executed by threads within the same process, which eliminates some memory access bugs, multiple maps for a single process may be used to provide curtained memory. To this end, memory isolation may be combined with controlled, closed memory map switching by trusted code to selectively limit the memory addresses that the threads of a process can access. For example, the threads of the process may ordinarily run at one privilege level, while map switching is only allowed at a higher privilege level. Since threads run through code, the map may be changed on entering or leaving certain verified and trusted code, thus controlling what memory addresses a thread can access based on what code is being executed at a given time. In this manner, only a small amount of trusted code decides what virtual memory a given thread can access and when, thus providing curtained memory without changing the microprocessor design.

The present invention may be implemented with any microprocessor that has protection and a protection-context-change mechanism. For example, in an x86 processor, the protection mechanism may comprise a call gate, with map switching not allowed except at a ring 0 privilege level. To change a map for a given code module, which operates at a ring 1 or higher privilege level, a hardware call gate switches to ring 0, where it executes code that switches the map such as to access protected memory, and then calls a predefined service entry point (e.g., a system API) on behalf of the code module. On return from the called service, the privilege level is restored to ring 1 and the code module is returned to a different map (e.g., with less access) on exit. Note that the process (threads) request allocation of memory as before, but trusted code (e.g., as part of the operating system) is in control of which map (e.g., Map0 or Map1 in a two-map process) the thread receives. To provide a truly-safe protection mechanism, certain data structures also may need to be protected, (e.g., the tables that determine the virtual-to-physical memory address mapping need to be protected from write access by untrusted processes), otherwise an untrusted process could simply change the table data (the mappings therein) to access otherwise protected memory.

However, this protected memory does need to be accessed for valid reasons, such as when allocating virtual memory to a process. The present invention does this by intercepting the request for memory at verified code, temporarily changing the privilege level to change the mapping, and calling the virtual memory allocation API on behalf of the process. When the API returns, the trusted code restores the map that does not allow access to the protected memory, restores the privilege to the level that does not allow the re-mapping, and then returns the virtual memory allocation information (e.g., list of allocated ranges) to the process.

Moreover, process switching to change maps at other times is a relatively costly and thus undesirable operation. Map switching among multiple maps eliminates the need to change a process in order to access different memory. For example, by changing the map, the same user process can access different sections of memory beyond the two gigabytes (or possibly three gigabytes) normally available to a user mode process. In such an application, multiple mapping facilitates expanded user mode memory addressing in the same process, enabling improvements to programs such as Microsoft® SQL server that desire additional addressable memory but do not necessarily want multiple processes. To this end, a process has multiple maps, each of which may map to some memory in common with other maps and also map to some memory that is unique to the map in a range above four gigabytes. To address the expanded memory, the process code chooses the appropriate map that points to the desired range or ranges, but otherwise may operate the same as any other process.

Further, less trusted code can be executed in a trusted process having a first map. When a thread runs the untrusted code, the process has that thread use a second map that restricts the memory locations and/or type of memory access available to those threads. This isolates untrusted code within a process by not allowing it to access any process memory that the trusted process does not want it to access, and/or only with the access rights granted by the process. Other similar benefits may be obtained via multiple maps.

Other advantages will become apparent from the following detailed description when taken in conjunction with the drawings, in which:

DETAILED DESCRIPTION OF THE PREFERRED EMBODIMENT

Exemplary Operating Environment

Figure 1:
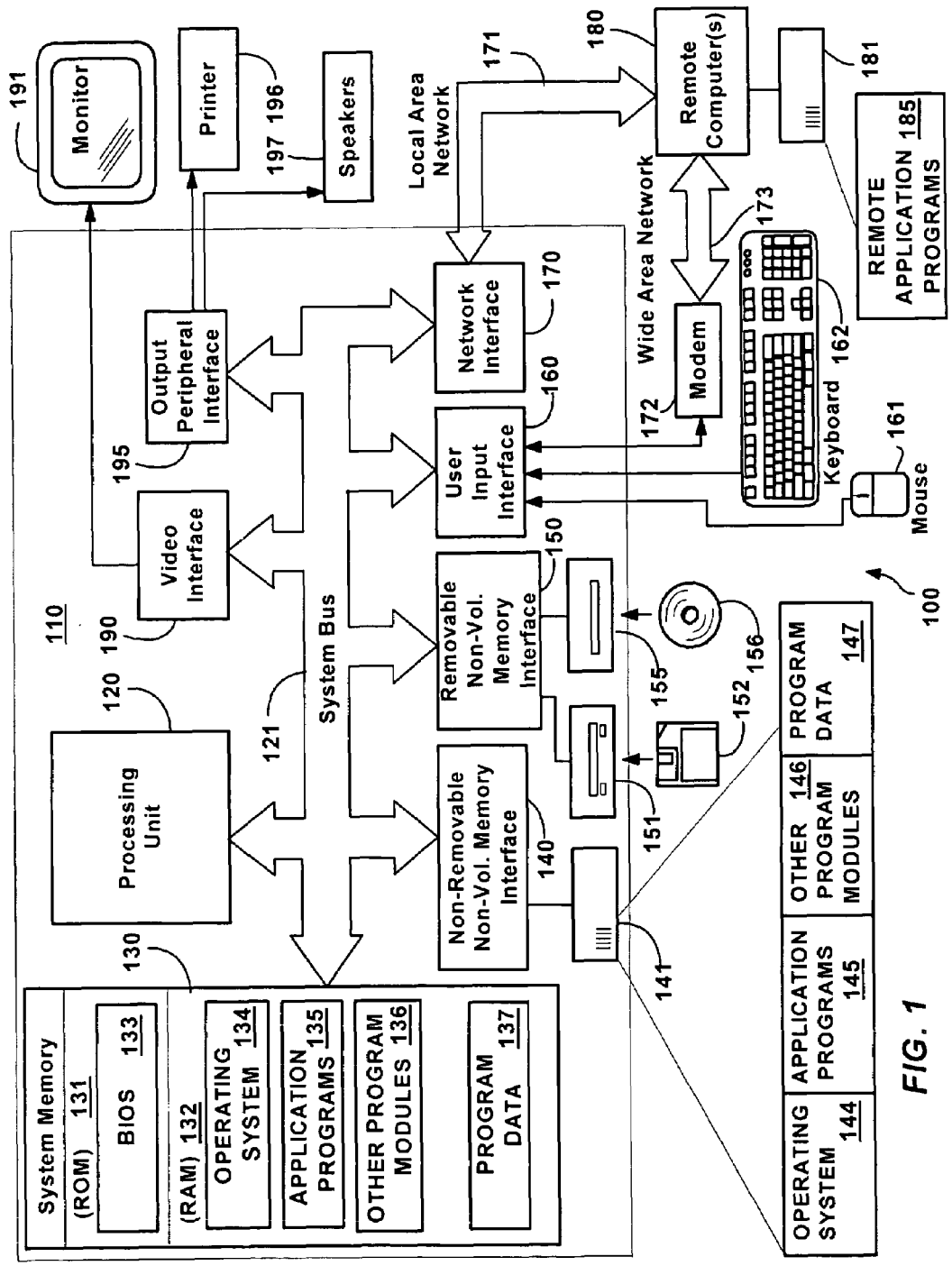
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
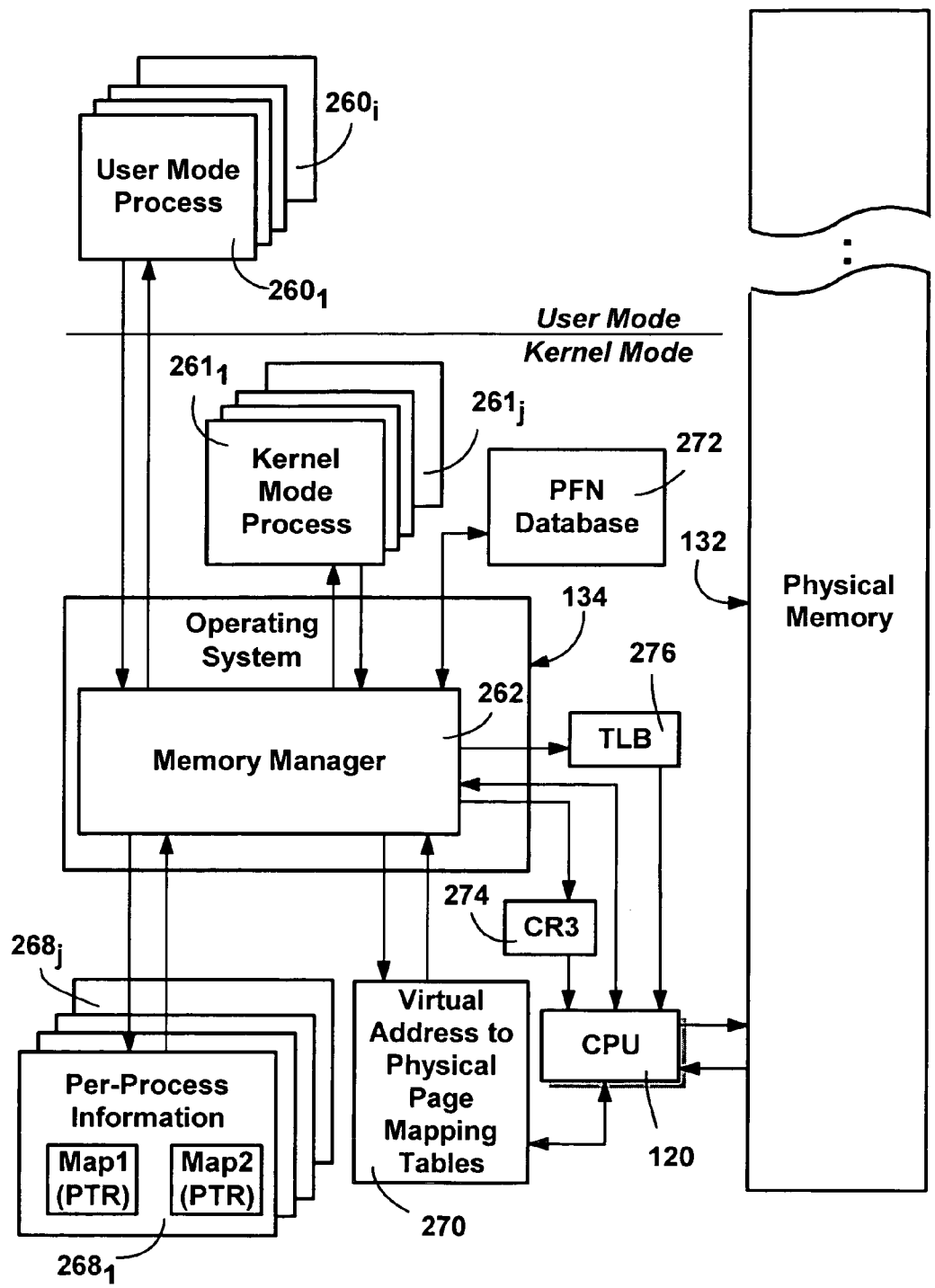
FIG. 2 is a block diagram generally representing a general architecture for mapping multiple maps in a single process in accordance with an aspect of the present invention.

Turning to FIG. 2 of the drawings, there is shown a general architecture into which the present invention may be incorporated. Note that the present invention is described herein with respect to the Windows® 2000 (formerly Windows® NT®) operating system and the x86 family of microprocessors. However, as can be readily appreciated, the present invention is not limited to any particular operating system and/or microprocessor, but rather may be used with any operating system or microprocessor that has protection and a protection-context-change mechanism. For example, and as will be understood, to build the protection mechanism on an existing system such as the x86, two kernel mode rings are needed, one of which restricts use of map loading and debug instructions. Alternatively, any other way to restrict special instructions can accomplish the same functionality. For example, while two kernel "rings" are not necessarily required, at least two distinct modes in kernel space are needed.

In FIG. 2, each process of a set of user mode processes $260_1$-$260_i$ and kernel mode processes $261_1$-$261_j$ communicates with the operating system 134 which includes a memory manager 262 for handling the memory requirements of the user level processes $260_1$-$260_i$, kernel-level components (such as driver) processes $261_1$-$261_j$, and the operating system 134 itself. In the Windows® 2000operating system, one task of the memory manager 262 is to manage virtual memory, which gives processes (e.g., $260_1$-$261_j$) the ability to address more random access memory (e.g., two gigabytes) than may be actually physically available in a given system (e.g., 128 megabytes). The memory manager 262 in Windows® 2000 accomplishes this through a combination of address translation techniques and disk swapping techniques, as generally described in the references entitled *Inside Windows NT®*, H. Custer, Microsoft Press (1993), *Inside windows NT®, Second Edition*, D. Solomon, Microsoft Press (1998), and *Inside Windows® 2000*, D. Solomon and M. Russinovich, Microsoft Press (2000), herein incorporated by reference.

To manage virtual and physical memory, the memory manager 262 maintains memory-related information in a process structure $268_1$-$268_j$ for each process, including for example, information (e.g., via a pointer) indicating which virtual memory locations are allocated thereto. The memory manager 262 also maintains a set of tables 270 that are used by the CPU 120 to translate virtual memory addresses to actual physical memory addresses. Note that the various components shown in FIG. 2 (other than the CPU 120) are often present within the physical memory (e.g., RAM) 132, but for purposes of clarity are not shown as loaded therein.

In physical memory in the Windows® 2000 environment, accessible memory is organized in units referred to as a page, wherein, for example, a page equals four kilobytes (4096 bytes in decimal) in an x86 microprocessor-based system. Other page sizes (e.g., eight kilobytes in an Alpha microprocessor-based system) may be employed. Indeed, there is no intention to limit the present invention to any particular microprocessor, page size and/or memory architecture, as it is expected that as microprocessors evolve into other page sizes and/or larger amounts of physical memory, such systems will also benefit from the present invention. Thus, as used herein, a "page" is not limited to any particular size, and may even be variable within a given system. A PFN (page frame number) database 272 is used by the memory manager 262 to track the physical pages in memory, including the relationships to virtual page addresses and other state information about the physical pages. Note that the PFN database 272 maintains state information about the actual physical memory installed in a system, e.g., there is a record in the PFN database 272 for each page of physical memory, not one for each virtual memory page address.

Multiplex Page Maps

Figure 3:
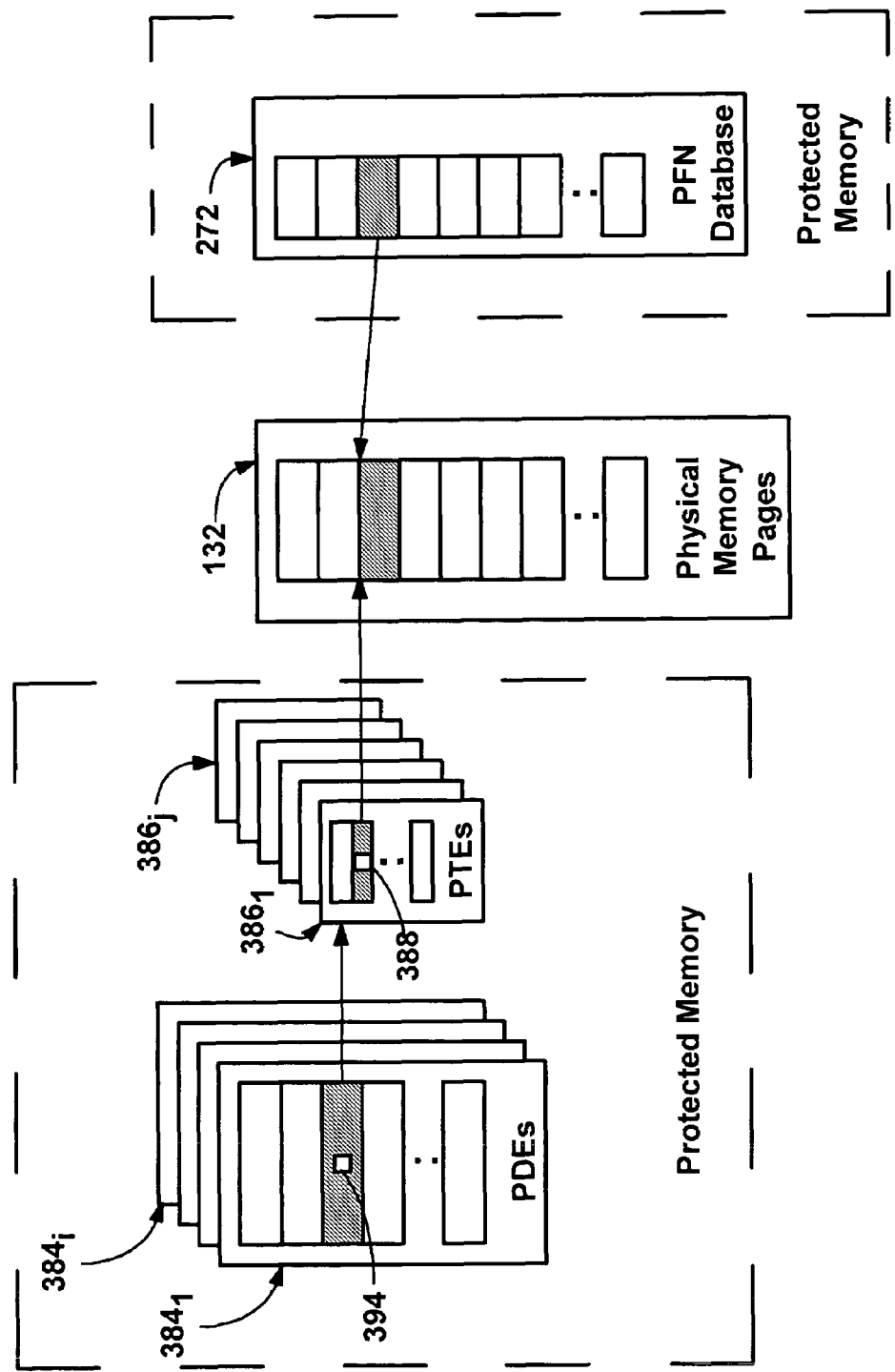
FIG. 3 is a block diagram generally representing components for mapping virtual memory to physical memory in accordance with an aspect of the present invention.
Figure 4:
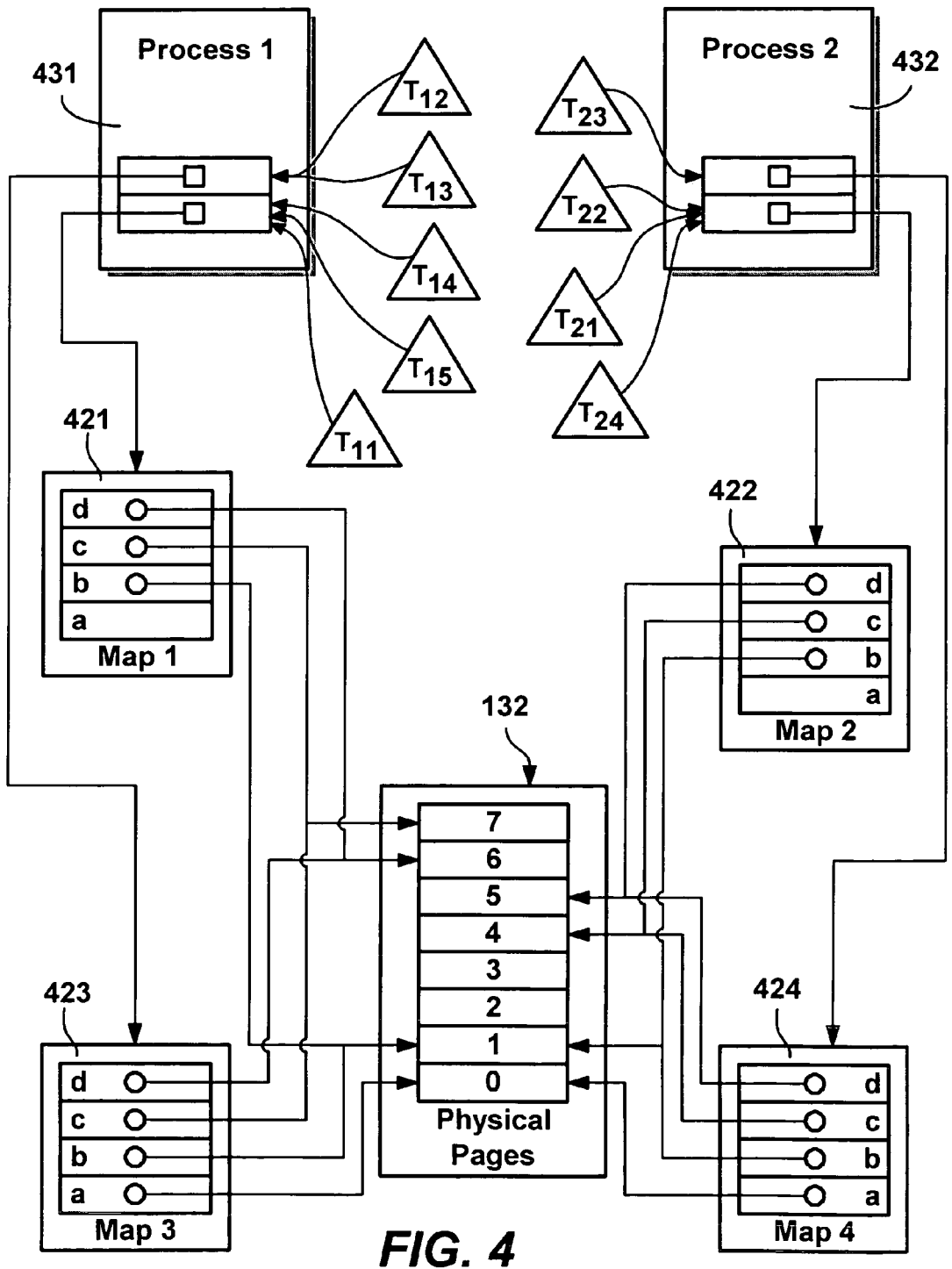
FIG. 4 is a block diagram generally representing processes having multiple maps and threads associated with those maps in accordance with an aspect of the present invention.

In accordance with one aspect of the present invention, each process (e.g., $261_1$) can have multiple maps associated with it (logically attached thereto) as generally represented in FIGS. 2-4. More particularly, as generally represented in FIG. 3 and described in the aforementioned *Inside Windows NT®* and *Inside Windows® 2000* references, each process that has virtual memory allocated thereto has one or more page directories $384_1$-$384_i$ maintained therefore by the memory manager 262, primarily used for converting a virtual address to a physical page of memory. The relevant virtual page address directory is located from part (e.g., the upper bits) of the virtual address provided by the process (e.g., $281_1$). Each page directory (e.g., $384_1$) has a number of page directory entries (PDEs), wherein each entry serves as an index to one of a set of page tables $386_1$-$386_j$. Each page table (e.g., $386_1$) includes page table entries (PTEs), one of which (indexed from another part of the virtual address) identifies the actual physical page in memory (RAM 132), along with flags regarding the state of the virtual page address, such as whether the virtual page address is currently mapped to a physical page (valid) or has been trimmed to disk (invalid). When a process is switched to, the operating system writes the map information to an address map-specifier, such as a register 274, (e.g., the CR3 register on x86 systems). Based on this, the CPU decodes the physical address from the virtual address which specifies the page table index used to locate a page table entry that describes the physical memory location, and a byte index which describes the byte address within that page.

In accordance with an aspect of the present invention as described below, the operating system can change the map even when the process is not switched, thereby allowing multiple maps per process. To this end, the operating system may be notified by the process as to which map (e.g., page directory page) is desired for a given thread, or the operating system can decide when a map change is needed, and writes the map information to the address map-specifier, e.g., the CR3 register 274 in x86 systems.

One such call (through an open gateway) to change a map essentially looks like this:

push CurrentThread.MapSelect
    TargetSelect=[map which spans the special code to call]
       switch to CurrentThread.Process—>Map[TargetSelect]
    call Target
    pop TargetSelect//return to state before the call switch to
       TargetSelect FIG. 4 logically represents the use of multiple maps in multi-threaded processes. In FIG. 4, the triangular shapes $T_{11}$-$T_{15}$ and $T_{21}$-$T_{24}$ represent threads, and each thread is associated with one of two (virtual to physical) memory maps logically attached to its corresponding process. Thus, in FIG. 4, threads $T_{11}$, $T_{14}$ and $T_{15}$ are currently associated with Map1 (also labeled 431), while threads $T_{13}$ and $T_{12}$ are currently associated with Map3 (also labeled 433), with Map1 and Map3 logically attached to Process1 (also labeled 441). Similarly, threads $T_{21}$, $T_{22}$ and $T_{24}$ are currently associated with Map2 (also labeled 432), while thread $T_{23}$ is currently associated with Map4 (also labeled 434) with Map2 and Map4 logically attached to Process2 (also labeled 442). Note that each thread generally has some state maintained in a data structure, (e.g., thread object), however as used herein, a thread is any unit of execution. Thus, as will be understood, the present invention will operate with any executable process, even those that do not have multithreading capabilities, i.e., such a process is equivalent to a process having only a single thread.

As shown in FIG. 4 via the arrows, each of the map entries essentially point to one of the physical pages in memory 132, as described above. Note that maps may map similar addresses to the same physical pages, or to different physical pages, and physical pages may or may not be shared. Particular virtual addresses (and thus access to the physical pages) may be present in one mapping and not in another.

To accomplish switching among multiple maps in accordance with an aspect of the present invention, the operating system 134 includes an array of address map pointers in its process structure, a thread structure which contains a process pointer (as before), and a map selection value. With multiple address maps attached to a process, each thread in the process may request which of the maps it will use, and/or have a map selected for it by trusted operating system code.

To appropriately switch maps, threads and/or processes, the operating system executes a routine such as set forth below and generally described in the flow diagram of FIG. 5:

```
if (OldThread.Process != NewThread.Process)
    // change both thread and process, which implies map
    // change
    Save OldThread.ThreadRegState
    switch to NewThread.Process->Map[NewThread.MapSelect]
    CurrentProcess = NewThread.Process
    Load NewThread.ThreadRegState
    Done
else if (OldThread.Process->Map[OldThread.MapSelect] !=
            NewThread.Process->Map[NewThread.MapSelect])
    // process is the same, but maps are different
    Save OldThread.ThreadRegState
    switch to NewThread.Process->Map[NewThread.MapSelect]
    // do not reload CurrentProcess, it has not changed
    Load NewThread.ThreadRegState
    done
```

```
else
    // process and map are the same
    Save OldThread.ThreadRegState
    Load NewThread.ThreadRegState
done
```

Figure 5:
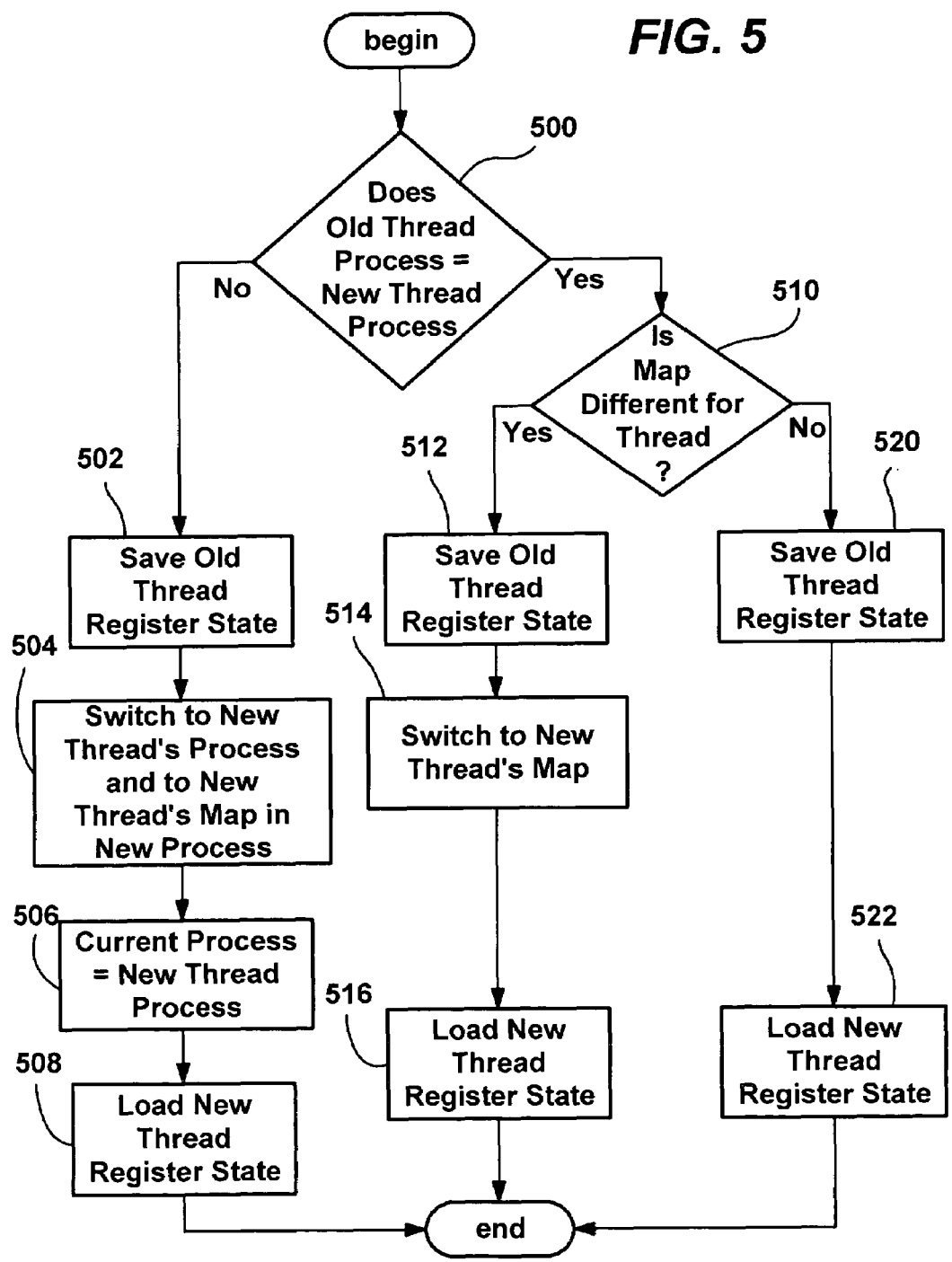
FIG. 5 is a flow diagram generally representing exemplary steps taken to switch maps, threads and/or processes in accordance with an aspect of the present invention.

FIG. 5 generally represents this logic, beginning at step 500 which tests whether the process of the old thread equals the process of the new thread. If not, a full process switch is required, as represented via steps 502, 504, 506 and 508, which in general save the old thread register state, switch to the new thread's process and its selected map, and load the new thread's register state.

If instead at step 500 the process is unchanged, step 510 determines whether the maps are different for this thread. If so, the old thread's state is saved, (step 512), the new map is switched to (step 514) and the new thread's state is loaded (step 516). Note that the current process is not reloaded, since it has not changed.

Lastly, if step 510 determines that the map is the same for the new thread, no map switch is required. Thus, steps 520 and step 522 are executed to save the old thread's state and load the new thread's state, respectively.

It should be noted that instead of maintaining separate maps at the memory manager level specifying what memory can be accessed, it is equivalent to maintain one main map, and maintain one or more other "maps" specifying access changes relative to the main map. The changes are then applied when memory restriction is desired.

One optimization that may be implemented in a multi-level map scheme (such as the pagedir/page table addressing scheme of the x86) maps map similarities and differences into certain boundaries, e.g., page table-spanned boundaries in the x86. For example, consider page table maps with four megabyte boundaries (as in the x86), wherein some maps are either the same with other maps, or unique unto themselves at four megabyte boundaries. In such a situation, memory management may express map differences by editing only the appropriate page directory entries, while treating PTEs normally. Taking the example of FIG. 4, maps 1 (#421) and 2 (#423) may use one set of page tables for sections b, c, and d. There would be one set for section a. In this example, the maps may have different page directories, which only differ in that map1 (#421) does not have a PDE for section a. With this scheme, PTE edits may be done only once, and automatically apply to multiple maps. Note that PDE edits (e.g., to add a new shared four-megabyte region which is shared) requires edits to be done to both page directories. Note that this technique can be applied in a system which has more than two addressing levels.

Further, although the above description refers primarily to maps being attached to processes, it can be readily appreciated that the above-described techniques would also work with sets of maps attached to each thread (e.g., with more copying amongst maps) and/or with "free-floating" maps that could be passed around (e.g., with code to associate/de-associate maps). While not optimal because of complex synchronization requirements, both of these are workable equivalents.

One efficiency-related optimization to speed map changes leverages the ability of some processors to load a translation look-aside buffer (TLB) 276 on a process basis, wherein a process switches (using a process/process identifier (PID) field) to select a different subset of the TLB. In this manner, the operating system can change maps without having to invalidate or reload the entire TLB, (which are inefficient operations). By treating each TLB "process" as an address map, when a map is changed, the hardware is told that the process/PID is changed, even though it is actually the same process. This effectively speeds up map switching, and does so without a process switch.

The ability to switch maps provides numerous benefits, one of which is increased robustness by isolating various code in a process from other code in a process. In other words, by selecting among multiple maps, a thread that runs certain code is not able to access (or for example, may be given lesser access such as read-only access to) the memory associated with some other code in the same process. This isolation provides protection from errant code (e.g., a driver) that incorrectly writes to memory, such as due to an accidental pointer reference or the like, without necessitating any change to the code itself. To isolate, the restricted map may simply omit the mappings to certain addresses, or the maps may list the same address mappings but with the inaccessible addresses marked invalid in the restricted map.

By way of example of isolation, in FIG. 4, it is possible for the thread $T_{12}$ of Process1 (431) to be running some ordinary kernel mode code, and thus be running on a full kernel mode address map, while "at the same time" the thread $T_{11}$ of the same process, Process1 (431), runs some restricted code (such as a device driver) and runs on a kernel mode address map which does not map any kernel private data, thus protecting that data from the restricted code. Thus, in FIG. 4, any thread of the process 431 cannot access a virtual location (a) that maps to physical page 0 when the map associated with that thread (e.g., $T_{11}$) is map 421 (Map1). Note that the address maps may have some memory that is mapped the same, whereby some of the memory allocated to a process may be accessed by any code (the thread that executes it), while other memory may be restricted to certain code in that process. Further, note that although not shown in FIGS. 2-4, a process may have more than two maps associated with it.

Trusted Memory Access Protection

In accordance with an aspect of the present invention, the above-described map switching may be controlled by trusted (verified) code, thereby preventing kernel mode code such as drivers (or even most of the operating system) from freely switching maps. In this manner, kernel-mode code (even malicious code) is unable to freely access restricted content in memory, whereby curtained memory is enabled. To this end, an already-existing hardware protection mechanism (such as a call gate in an x86 system) may be employed to switch maps in a closed-gateway concept, and since threads run through code, the map may be selectively changed by the trusted code on entering or leaving certain code. Code can thus be protected by only letting it be accessed by a particular map, and the map switch can be controlled by a closed gateway.

Figure 6:
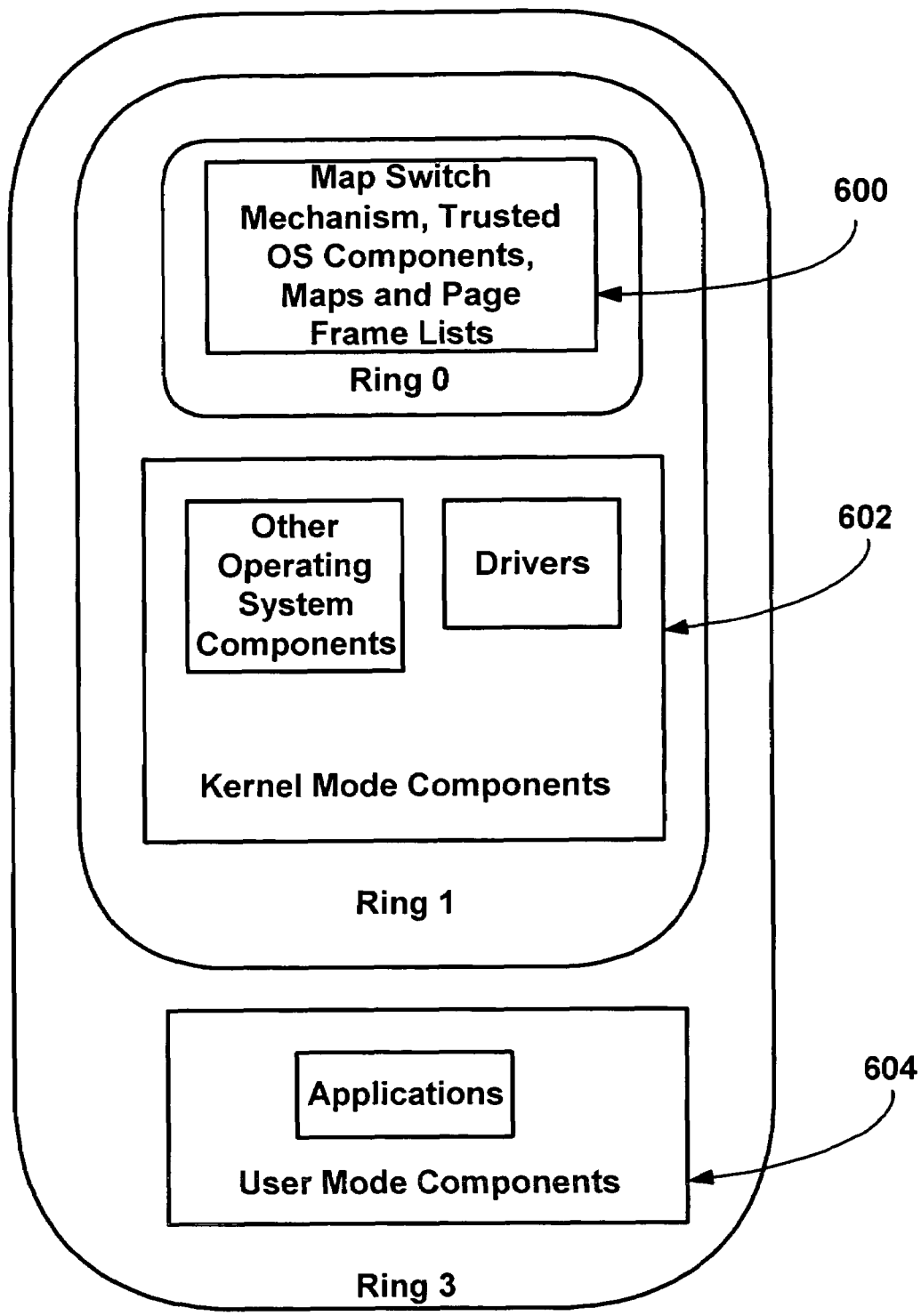
FIG. 6 is a representation of privilege levels and components therein for providing curtained memory in accordance with an aspect of the present invention.

By way of example, in x86 systems, a call gate is a mechanism used to switch privilege levels. Four rings, or privilege levels are available, however prior to the present invention, only two are used by contemporary operating systems, ring 0 (the most-privileged level) for kernel mode code and ring 3 for less privileged, user mode code. As generally represented in FIG. 6, to provide memory protection in accordance with the present invention, map switching and some trusted operating system operations will be performed at ring 0, the most privileged level. To this end, the protected components 600 including the protected code and other components including maps and page frame lists as described below are accessible only at that Ring 0 level. Other kernel mode code components

602 will have their operations performed at the ring 1 level, (with user mode code and other components 604 remaining at ring 3). In this manner, a kernel mode process is restricted to requesting a map switch, or having a map switch done for its thread by trusted operating system code only as needed and when the code being executed by the thread is known to be safe, wherein only a relatively small amount of trusted code is needed to control the map switching operations.

Figure 7:
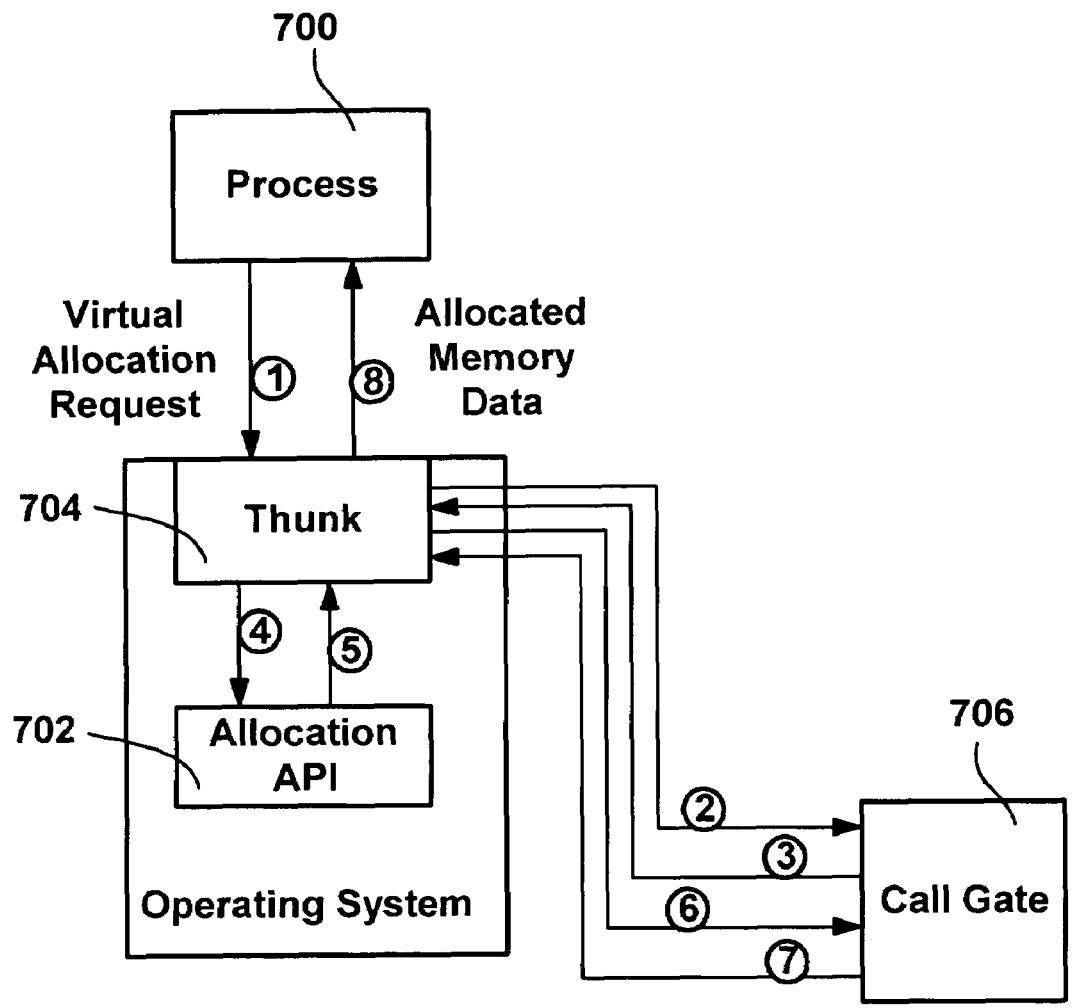
FIG. 7 is a representation of how privilege levels and maps are securely changed under the control of trusted code in accordance with an aspect of the present invention.
Figure 8:
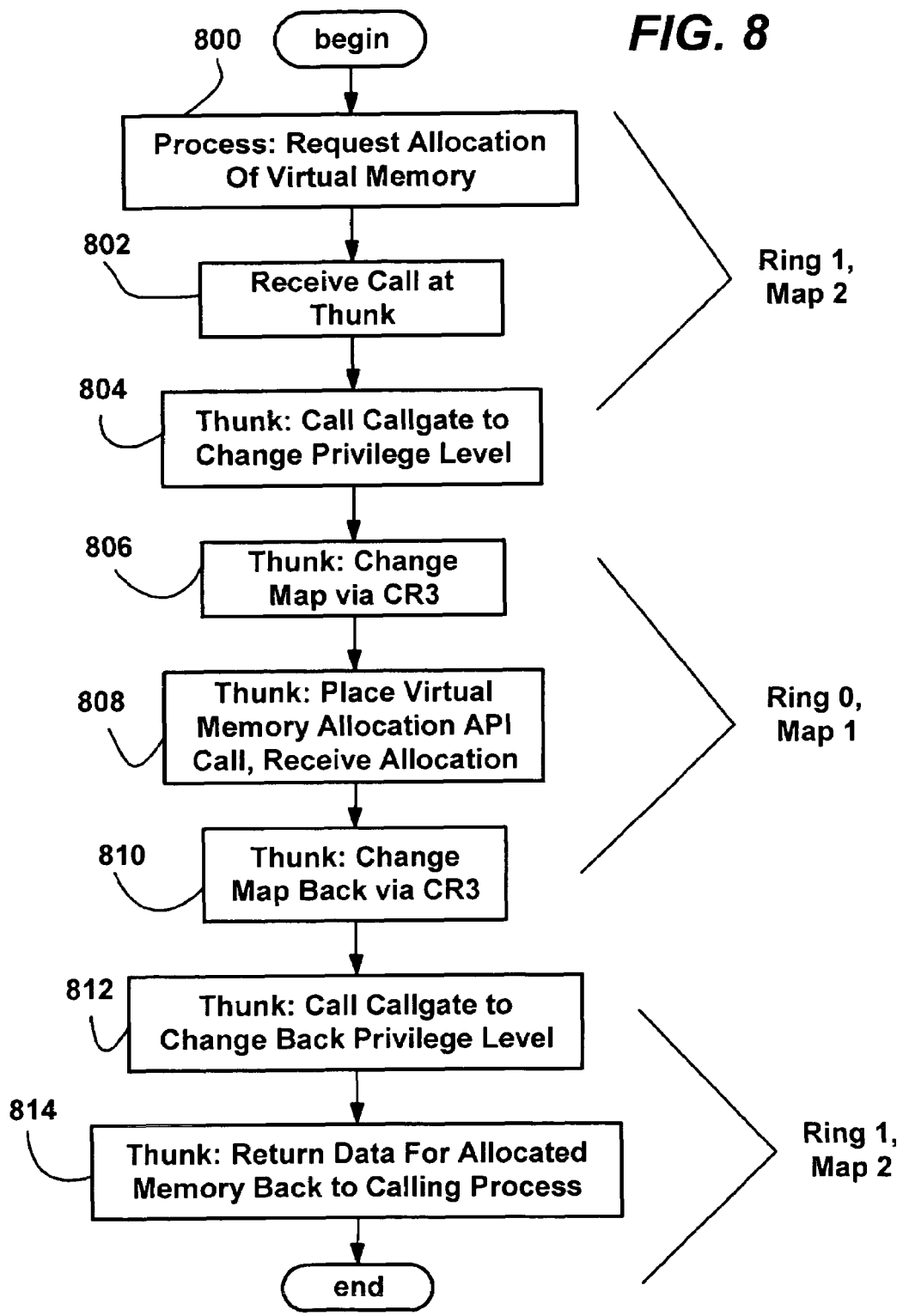
FIG. 8 is a flow diagram generally representing exemplary steps taken to securely allocate memory to a process in accordance with an aspect of the present invention.

For example, FIG. 7 and the flow diagram of FIG. 8 generally describe one way in which memory access protection is achieved without changing the kernel code (e.g., driver) that is executed. In the example of FIGS. 7 and 8, a driver process 700 running at ring 1 privilege level and a map 2 (restricted relative to a map 1) is requesting allocation of virtual memory, which it does in its normal manner, such as via a call to an API 702 in the Windows® 2000 environment. This is generally represented in FIG. 7 by the arrow labeled with circled numeral one, and in FIG. 8 by step 800. However, while the driver process 700 places such a call in its normal manner, in actuality the call is received and otherwise processed by a thunk (code that re-vectors a call) 704 or the like, (step 802 of FIG. 8). In this example, because memory allocation requires access to protected memory (e.g., to update the page tables), the thunk 704 calls through a call gate 706 to change the privilege level to ring 0 (circled numerals two and three, FIG. 7, and step 804, FIG. 8). This ring 0 privilege level allows map switching, after which the thunk 704 changes the memory map to map 1 by writing the CR3 register (step 806 of FIG. 8). At this time, the thread has access to protected memory, thus allowing virtual memory to be properly allocated, however the thread is currently running through trusted code of the thunk, not the driver code. The thunk 704 then places the virtual memory allocation API (application programming interface) call on behalf of the requesting process 700 at circled numeral four of FIG. 7 (step 808 of FIG. 8), and receives the virtual memory allocation data (e.g., list of memory ranges allocated) as represented in FIG. 7 via circled numeral five.

At steps 810-812, the thunk 704 essentially operates in reverse, changing the mapping back to map 2 (step 810) by writing the CR3 register, and then calling the call gate 706 to change the privilege level back to ring 1 (circled numerals six and seven of FIG. 7, step 812 of FIG. 8). The thunk 704 then returns the data for the allocated memory back to the calling process, and returns control thereto (circled numeral eight FIG. 7, step 814 of FIG. 8). Note that the thread is only given access to protected memory when the thunk or API code is executing, i.e., the code of the process executed by that thread is never given access to the protected memory. In this manner, curtained memory is achieved by controlling precisely what memory a process can access based on the code through which the thread of that process is running.

Note that instead of using a thunk, the virtual allocation API and any other APIs that need access to protected memory can be changed. However, the use of a thunk to perform the privilege level and re-mapping operation eliminates the need to change the existing APIs.

Further, note that in the above example, although more privilege and memory access via a less restrictive map was temporarily allowed, it was controlled by entering a known, safe service entry point. Upon returning, the ring 1 privilege level and more restrictive map were restored. In essence, in keeping with the present invention, the large majority of the kernel code including drivers and most of the operating system runs at a ring 1 privilege level, but is otherwise unchanged. Since existing code was heretofore not normally concerned with its privilege level, the vast majority of reputable code will be unaware of any change, although malicious programs that relied on full privilege will no longer have it.

Moreover, even with the above-described protected memory system, any process can have multiple maps as described above (e.g., for memory isolation purposes). However, because a privilege change is needed to re-map in the protected memory scheme, the process will not be allowed to change among its maps without calling trusted operating system code to do the map change for it. An API may be provided for this purpose, whereby the thunk or the like changes the privilege level, causes the remap via the CR3 register to a different map of the process (not to a map that gives access to protected memory), and then restores the privilege level. Note that the process can only map to memory that the operating system has allocated to it, as it cannot change its map or access the mapping data. Thus, for example, a kernel mode driver cannot freely access user mode data, including privileged content. In addition to allocating memory, a trusted function may be used to allocate handles, synchronization objects, processes, threads and so forth. The function may also perform trust-privileged operations, such as signaling a synchronization object, deleting a timer, or closing a handle. Freeing memory is also an important trusted function as is changing mapping. Indeed, any operation that touches a page table or the PFN database also needs to be trusted.

As one alternative to the above-described map-switching via CR3 loads, it is possible to edit a process map on entry/exit from trusted space. For example, this may be accomplished by manipulating select entries in the Page Directory (making things appear/disappear in four megabyte blocks) or by directly editing lists of PTEs. Note that this would likely be slower.

Thus, to fully protect against various possible attacks, certain data needs to be maintained in protected memory, as generally represented by the dashed boxes in FIG. 4, by controlling mapping via trusted code and making the memory be inaccessible through direct memory access (DMA), i.e., via one or more no-DMA zones. For example, the page tables need to be protected, to prevent a process from simply changing the information therein to grant it access. If the TLB was in software, (in contrast to existing systems where the TLB is in hardware), then supporting structures for such a software TLB would also be in trusted space. Similarly, the PFN database 272 (FIG. 2) needs to be in protected memory, otherwise a process could change the information therein to cause data to be paged back into memory that the process can access. Also, the thread structures (objects) and process structures (objects) should be in protected memory, as should the trusted operating system code, including the thunk and memory manager, which comprise instructions in memory, the Global Descriptor Table (GDT) and interrupt descriptor table (IDT). For example, a trusted system built with the present invention may use an IDT that is in trusted space, but which routes interrupt/traps/exceptions to either trusted or untrusted space as needed. More particularly, the page fault handler will be in trusted space, (e.g., to prevent perverting trusted code by intercepting a page fault), whereas normal interrupt service routines may run in untrusted space. The NoDma zone can be accomplished via a hardware assist from the motherboard/platform, or via very restricted platform design that allows it to be programatically constructed.

By proper construction of the trusted code, entities such as handles and synchronization objects may be protected, with some allowed to be referenced by any code, and others only by trusted code. This is done by requiring that protected entities are only manipulated by trusted code, which checks a "TrustAttribute" or the like of the calling process or thread to decide which handles and synchronization objects may be manipulated. By way of example, it can be arranged such that untrusted code may create, delete, and use timer objects as before, however untrusted code will be unable to delete or manipulate system (trusted) timer objects, in addition to being unable to access them. Note that various ways to securely boot a computer system with the trusted operating system of the present invention are available.

Similarly, certain additional protection should be undertaken. For example, in an x86 processor, the following instructions are made illegal at Ring 1, and thus only available to the trusted operating system code running at ring 0: writing the CR3 register (MOV CR3) as described above, writing the machine status register, setting debug registers, loading the interrupt descriptor table register (IDTR) and loading the global descriptor table register (GDTR). As can be appreciated, these various protections are architecture specific, and may include machine-check control, micro-code-patch instructions, and so forth, while others may be chip specific (e.g., jtag test control). In any event, one skilled in the art with a particular hardware configuration will recognize which operations need to be restricted to trusted mode, and the extent to which that hardware configuration already naturally provides protection.

Heretofore it was believed that a fundamental change to the design of microprocessors was required to provide this type of security, however the present invention can accomplish such security, and bolster it with relatively little motherboard modification. To this end, bridges and the like may be modified to protect the CPU cache from direct memory access reads or the like.

Addressable Space Expansion

In accordance with another aspect of the present invention, the use of multiple maps allows a single process to access a relatively large amount of physical memory (e.g., thirty-two gigabytes) with only a relatively small amount of addressable (virtual address) space (e.g., two gigabytes). As is known, a process has a significant amount of state associated with it, possibly including handles, an access token, security identifiers and so forth, which makes a process switch relatively expensive, as well as inconvenient for developers who at times would prefer not to have to switch processes. Note that it is not just the expense of the process switch that is saved, but having a single process saves on the communication (requiring marshalling/copying) of memory, pointers, handles, objects and so forth between processes. In the present model, the meaning of pointers is context sensitive (as which map is in use) but is otherwise fully normal, unlike multi-process RPC models in which pointers are heavily constrained.

For example, a program that needs access to large amounts of memory such as Microsoft® SQL Server at times would likely benefit from being able to access large amounts of memory from only a single process.

Figure 9:
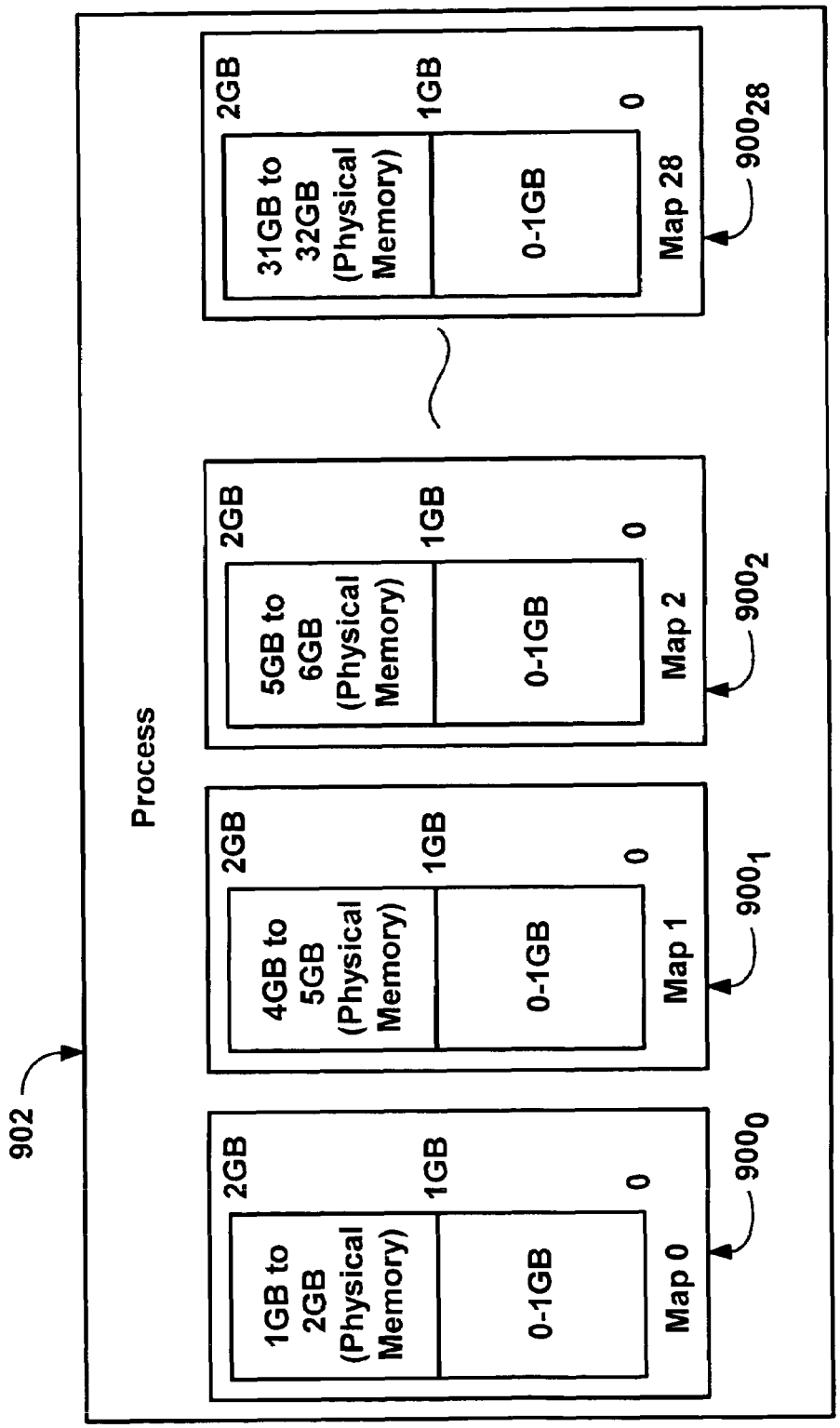
FIG. 9 is a representation of how multiple maps may be used in a single process to obtain access to expanded memory in accordance with an aspect of the present invention.

By way of example, FIG. 9 shows one such possible set of maps $900_0$-$900_{28}$, wherein each map of a multiple map process 902 shares the same one-gigabyte of address space, with a second gigabyte of virtual memory that maps to a different section of physical memory. Note that in the example of FIG. 9, the operating system has reserved virtual memory addresses from 2 GB to 4 GB.

Although not shown in FIG. 9, the shared memory can be in kernel mode addressable memory rather than user mode memory, thus allowing access to an additional one gigabyte of user mode memory. Also not specifically shown but readily understood is that the access rights in the shared one-gigabyte of memory may be identical in all of the maps, less than all of the maps, or in none of the maps. Further, it can be readily appreciated that the memory range sizes and number of maps shown in FIG. 9 is only an example, and can be varied in virtually any way.

To provide user mode map switching, some user mode APIS may be provided as generally set forth below:

CreateMap( )—returns a map#

DeleteMap(map#)—frees the map, if (and only if) there are no threads attached to it, and it is not map#0, the basic map.

AttachToMap(map#)—switches the current thread to be running on map map#, where it will stay until it calls AttachToMap again.

MakeRegionCommon(address-range)—tells the system that memory and address map edits in range address-range are to be propagated across all maps in the process. (It is feasible to allow certain maps to be chosen, rather than all).

With the above APIs, a single process can set up its maps in a straightforward manner, such as by using the code set forth below (generally corresponding to FIG. 9 when the physical memory limit equals 32 GB):

```
for (i = 1; i < LIMIT; i++) {
    m = CreateMap( )
    if (error(m))
        done
    maplist[i] = m;
    AttachToMap (m);
    //
    // we have a new map, which is a copy of the
    // previous one
    // so unmap anything between 1 and 2 (which was a
    // phys map anyway) and map in some new physically
    // mapped memory)
    //
    UnmapPhys (ONE_GIG);
    MapPhys(ONE_GIG, PHYS_BASE+((i-1) * ONE_GIG);
}
MakeRegionCommon(0 to 1 GIG);
```

At this point, the maps are the same from 0 to 1 GB (virtual addresses), and all of them are different from 1 GB to 2 GB (virtual addresses). Each map maps a different 1 GB of extended physical memory into its 1 GB to 2 GB area. Any thread can get to any area of extended physical memory by calling AttachToMap( ) with the appropriate map specified.

While the above-described virtual addresses mapped to physical addresses in which the addresses are numerically larger than the largest virtual address. However, it should be pointed out that a system with less or the same amount of physical memory as addressable virtual memory, may also benefit from the present invention. For example, in a system having only 4 gigabytes (GB) of physical memory, only 128 MB may be given to the OS, with access to some physical location between 3 GB and 4 GB desired using only 2 GB of virtual space. The above-described techniques will enable access to these physical locations. Further, any extended memory (above 4 G in the general examples) may, or may not be, pageable, as there is no reason that 4 GB is special for this technique. Instead, this aspect of the present invention extends virtual addresses on any machine that can have more physical memory than virtual memory, whether that is below a certain physical space (e.g., in sub-4 GB space or not).

Note that instead of an API call, the map switching can be made automatic. For example, a page-fault fix-up handler can switch in the map when some page faults are trapped by the application (using exceptions). More particularly, the thread can be switched to a partially empty map, (possibly after a time-out), whereby the thread touches an always not-present page in common memory. This page fault causes a map that corresponds to the data the thread wants to be automatically loaded. In other words, the code, which is not concerned with maps, touches a "refresh pointer" to get the address of an object, and this pointer reference may be used to automatically cause a map change that can access the object.

In-Process Memory Protection

In accordance with another aspect of the present invention, the use of multiple maps allows a process to isolate code being run in-process from certain memory of that process. For example, a process may wish to run untrusted code (e.g., downloaded from an unknown source) without performing a process switch or using interprocess communication, yet not want that untrusted code to get at some of its memory. Note that the process itself may have restricted rights relative to a parent process to prevent untrusted code from doing other types of harm.

Figure 10:
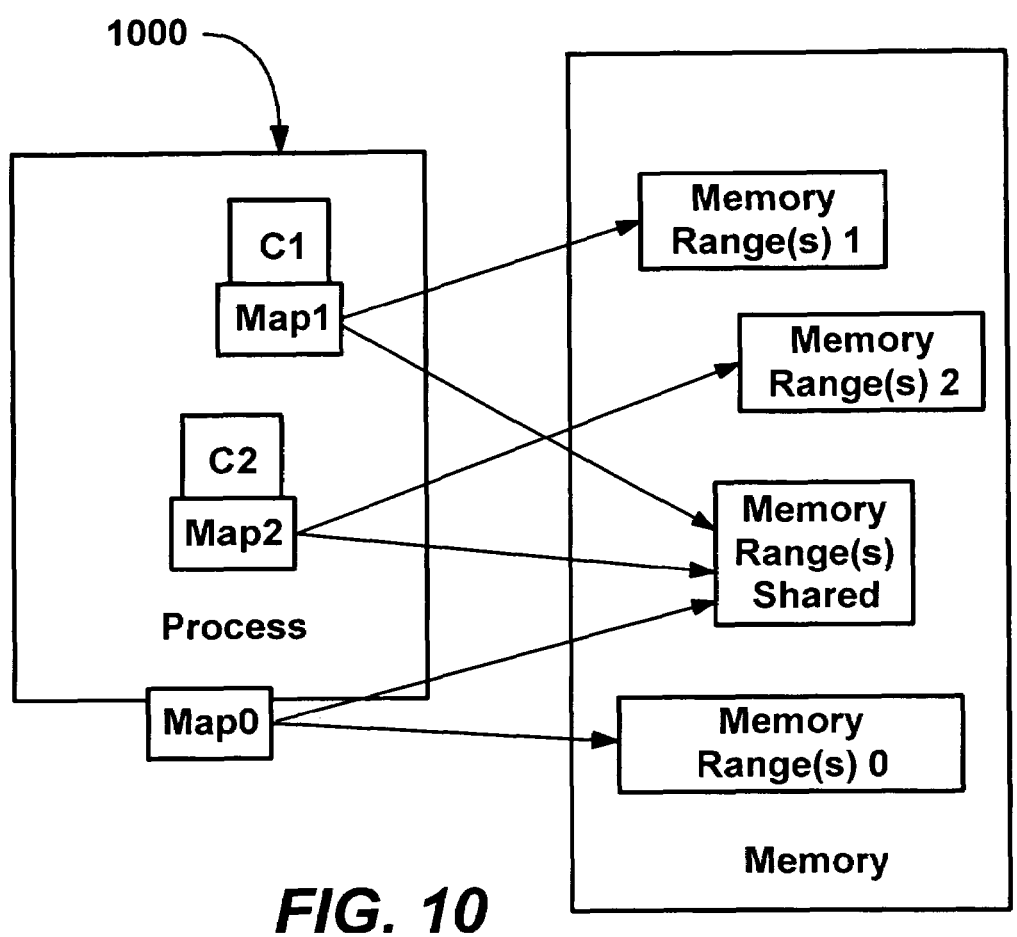
FIG. 10 is a representation of how multiple maps may be used in a single process to isolate memory access of code executed in-process in accordance with an aspect of the present invention.

As generally represented in FIG. 10, some untrusted code C1 is run within a process 1000, but mapped to a map Map1 that is partially, different relative to a map of the process Map0. If desired, the process code can share some memory with the code C1, with potentially different access rights, on a per-page basis. In this manner, the process 1000 isolates its memory from the code C1 to the extent the process 1000 desires. Similarly, other code C2 can be isolated from the process memory and the code C1's memory, again as controlled by the hosting process 1000. Some or all of C2's memory may be shared with the process and/or with C1's memory, with access rights controlled by the process on a per-page basis.

As can be seen from the foregoing detailed description, there is provided a method and system for using multiple maps in a memory for providing security, increased memory access and memory isolation. The method and system may be implemented on existing microprocessors and without changing existing kernel mode components, other than a small part of the operating system.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. At least one computer storage medium, having computer-executable instructions which when executed perform steps, comprising:

receiving a request via a process thread having a first memory map associated therewith changing a privilege level to a level that allows a memory map change;

performing the memory map change to associate a second memory map with the process thread, the second memory map providing different memory access with respect to the first memory map; and restoring the privilege level to a level that does not allow a map change, wherein the first and second memory maps each include a mapping that maps a virtual memory address to a physical memory address that is larger than the largest possible virtual memory address that an entity is allowed to address, wherein the first and second memory maps each include a mapping that maps a virtual memory address to a physical memory address that is the same, wherein the virtual memory address that maps to a physical memory address that is larger is in user mode addressable space, and wherein the physical memory address that is the same is in kernel mode addressable space.

2. At least one computer storage medium, having computer-executable instructions which when executed perform steps, comprising:

associating first, second and third address maps with a process, wherein at least the second address map includes a mapping that maps a virtual address to a physical address that is larger than the largest possible virtual memory address and the third map includes a mapping that maps a virtual address to a physical address that is larger than the largest physical address mapped to by the second map;

receiving a request from a thread of the process to change from the first address map to the second address map;

changing the first address map to the second address map;

using the mapping to access data at a physical memory location having a physical address that is larger than the largest possible virtual memory address; and switching to the third map to access data at the physical address that is larger than the largest physical address mapped to by the second map.

3. At least one computer storage medium, having computer-executable instructions which when executed perform steps, comprising:

receiving a request via a process thread having a first memory map associated therewith;

changing a privilege level to a level that allows a memory map change;

performing the memory map change to associate a second memory map with the process thread, the second memory map providing different memory access with respect to the first memory map and accessing protected memory;

restoring the privilege level to a level that does not allow a memory map change;

executing trusted code while the second memory map is associated with the process thread, including entering at a predefined entry point a function that performs at least one trust-privileged operation from among a set of trust-privileged operations, the set including: signaling a synchronization object, deleting a timer, and closing a handle.

4. The computer readable medium of claim 1, wherein receiving a request comprises receiving an application programming interface call at an operating system component.

5. The computer readable medium of claim 1, wherein receiving a request comprises, receiving at an operating system a call from a kernel mode component.

6. The computer readable medium of claim 1, wherein the second memory map accesses protected memory, and further comprising, executing trusted code while the second memory map is associated with the process thread.

7. The computer readable medium of claim 6, further comprising, performing a second map change to re-associate the first map with the process thread.

8. The computer readable medium of claim 6, wherein executing trusted code includes entering a function at a predefined entry point.

9. The computer readable medium of claim 8, wherein the function performs a trust-privileged operation.

10. The computer readable medium of claim 1, wherein the first and second memory maps each map a virtual memory address to a physical memory address that is common to both maps.

11. The computer readable medium of claim 1, herein the second map maps to memory that is invalid in the first map.

12. The computer readable medium of claim 1, wherein the second map maps to memory that has different access rights in the first map.

13. The computer readable medium of claim 2, wherein the second memory map has more access rights to virtual memory addresses than the first memory map.

14. The computer readable medium of claim 2, wherein the trusted code includes a thunk configured to re-vector a function call directed to one set of code to another set of code.

15. The computer readable medium of claim 2, wherein the trusted code changes the thread from being associated with the first map to be being associated with the second map by instructing a hardware component to select a different subset of a translation look-aside buffer.

16. The computer readable medium of claim 2, wherein the trusted code performs a second map change to re-associate the first map with the process thread, and invokes the protection mechanism to not allow map changing.

17. The computer readable medium of claim 2, wherein the first and second memory maps each include a mapping that maps a vital memory address to a physical memory address larger than the largest possible virtual memory address that an entity is allowed to specify.

18. The computer readable medium of claim 3, wherein receiving a request comprises receiving an application programming interface call at an operating system component.

19. The computer readable medium of claim 3, wherein receiving a request comprises, receiving at an operating system a call from a kernel mode component.

20. The computer readable medium of claim 3, wherein the first and second memory maps each map a virtual memory address to a physical memory address that is common to both maps.

* * * * *